United States Patent [19]

Hetzel

[11] Patent Number: 4,992,171
[45] Date of Patent: Feb. 12, 1991

[54] FILTERING DEVICE WITH AGITATOR

[75] Inventor: Hartmut Hetzel, Cologne, Fed. Rep. of Germany

[73] Assignee: Bayer Aktiengesellschaft, Leverkusen, Fed. Rep. of Germany

[21] Appl. No.: 486,472

[22] Filed: Feb. 28, 1990

[30] Foreign Application Priority Data

Mar. 4, 1989 [DE] Fed. Rep. of Germany ....... 3907040

[51] Int. Cl.$^5$ ............................................. B01D 29/64
[52] U.S. Cl. ..................................... 210/413; 210/415
[58] Field of Search ............... 210/255, 332, 334, 357, 210/321.69, 407, 413, 414, 415, 791

[56] References Cited

U.S. PATENT DOCUMENTS

| 684,555 | 10/1901 | Simpson | 210/415 |
| 4,880,539 | 11/1989 | Crawford et al. | 210/415 |
| 4,919,806 | 4/1990 | Yagishita | 210/414 |

FOREIGN PATENT DOCUMENTS

| 220296 | 1/1907 | Fed. Rep. of Germany . |
| 1064032 | 5/1954 | France . |
| 1356496 | 2/1964 | France . |

Primary Examiner—W. Gary Jones
Assistant Examiner—Christopher Upton
Attorney, Agent, or Firm—Joseph C. Gil

[57] ABSTRACT

The present invention relates to a filtering device with an agitator. The filtering device broadly consists of a horizontal filter plate with a central discharge opening and an agitator shaft disposed vertically and centrally to the filter plate. The agitator shaft has two agitator arms, with agitator blades being disposed on the agitator arms, pointing towards the filter plate and set at an angle to their circular path.

3 Claims, 2 Drawing Sheets

FILTERING DEVICE WITH AGITATOR

BACKGROUND OF THE INVENTION

The present invention relates to a filtering device with an agitator. The filtering device broadly consists of a horizontal filter plate with a central discharge opening and an agitator shaft disposed vertically and centrally to the filter plate. The agitator shaft has two agitator arms, with agitator blade being disposed on the agitator arms, pointing towards the filter plate and set at an angle to their circular path.

Filtering devices of this kind, which are also known as agitator-type suction filters, are used for the following steps of the filtering process: filtering, washing (suspension), drying, and removal. The agitator is of crucial importance here. After filtering, it serves, in the washing process, to suspend the filter cake in the washing agent. In the drying state, the agitator serves to divide the washed filter cake into fine particles and to ensure that there is good heat exchange and exchange of compounds with the heated container wall, as well as to remove the solid matter as far as possible from the suction filter. Agitation of the solid filter cake causes particular problems as the said filter cake offers a high degree of resistance to the agitator.

Therefore, agitators are used which, e.g. by means of an additional movement of stroke, ensure that the agitator blades are only inserted by degrees into the filter cake. Agitators of this kind are very expensive and sealing the agitator shaft poses a particular problem.

The object of the present invention was to improve the filtering device described initially in such a way that the agitator only requires a rotating seal and that nevertheless the agitator blades only act gradually on the filter cake.

DESCRIPTION OF THE INVENTION

The above noted problem is solved in that as a result of the resistance of the filter cake disposed on the filter plate, the agitator blades can move out of their normal position at an angle to their circular path into the positon tangential to their circular path. According to one particular embodiment, this movement can be effected in that the agitator blades are pivoted on to the agitator arm by means of bolts and are tensioned in the same direction as the direction of rotation of the agitator. This means that when the agitator is started, the agitator blades inserted into the solid filter cake are pressed against the spring tension into the tangential position and thus offer less resistance. As the filter cake increasingly disintegrates, the spring tension outweighs its resistance and the agitator blades once again become active as conveying elements, advancing outwards for washing and drying, and for removal, reversing the direction of rotation and advancing inwards towards the central discharge opening.

According to another embodiment, the agitator blades are made of wear-resistant, elastic material and are fixed securely in their normal positon at an angle to their circular path by means of bolts. The procedure is then the same as that of the first embodiment, although instead of the spring tension, it is the elasticity of the agitator blades that becomes active, as a result of which the agitator blades are deformed by the resistance of the filter cake, so that they assume the tangential position.

Figure 1:
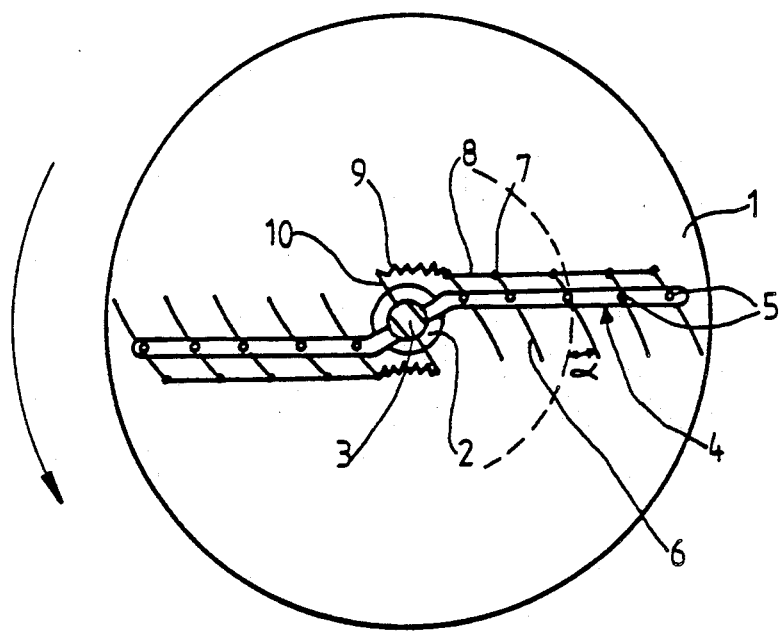
FIG. 1 shows a top view of the filtering device according to a first embodiment with the agitator blades in the active advancing position.
Figure 2:
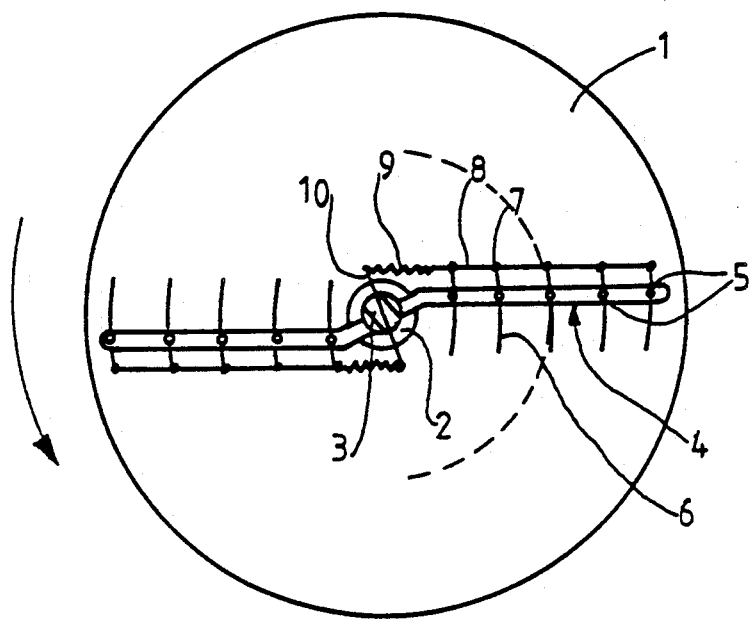
FIG. 2 shows a top view of the filtering device according to FIG. 1 with the agitator blades in the neutral position.

The new filtering device according to the two embodiments will now be described in more detail with reference to the drawings. In FIGS. 1 and 2, the filtering device consists of a disc-like filter plate 1 which has a central discharge opening 2. Above this discharge opening 2 there is an agitator shaft 3 which has two agitator arms 4. Bolts 5 are disposed on said agitator shaft 3 at a uniform distance from the filter plate 1, said bolts 5 holding agitator blades 6. The shorter ends of the agitator blades 6 of the agitator arms 4 are supported on a connecting rod 8 by means of pins 7, said connecting rod 8 being secured by means of a spring 9 to a cross beam 10 disposed on the agitator shaft 3. The springds 9 have a force less than that exerted on the agitator blades 6 by the filter cake, but greater than that of the well disintegrated filter cake.

Figure 3:
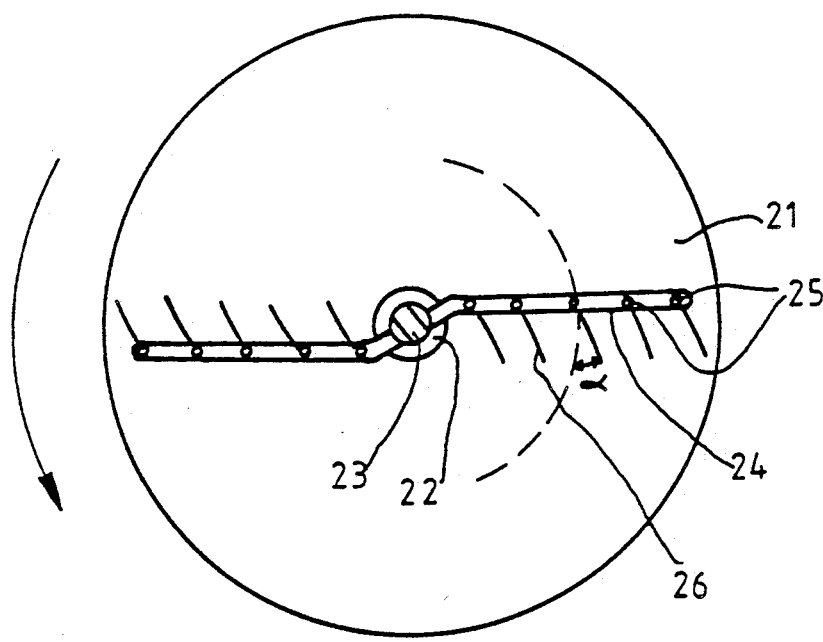
FIG. 3 shows a top view of the filtering device according to a second embodiment with the agitator blades in the active advancing position.
Figure 4:
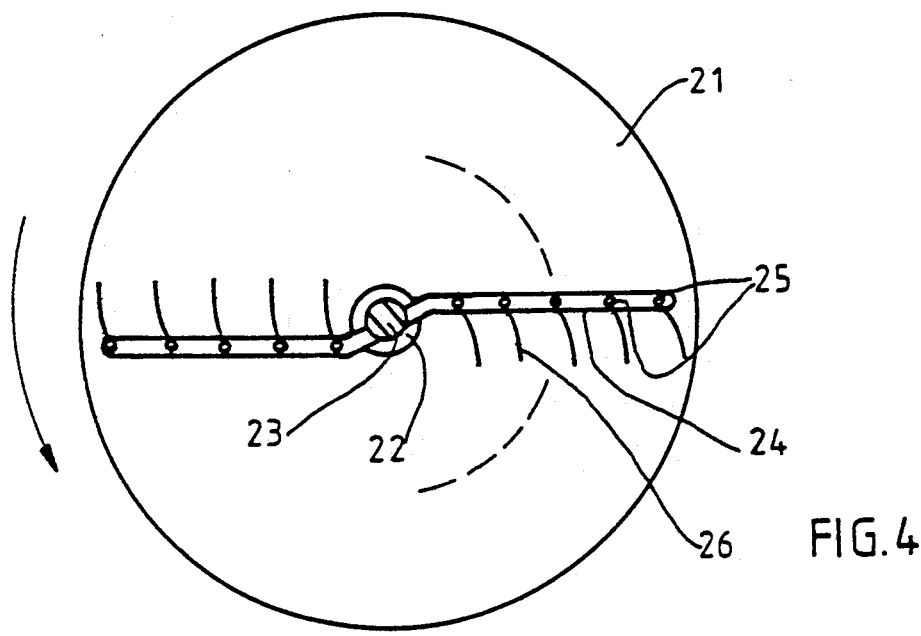
FIG. 4 shows a top view of the filtering device according to FIG. 3 with the agitator blades in the neutral position.

In FIGS. 3 and 4, the filtering device consists of a disclike filter plate 21 which has a central discharge opening 22. Above this discharge opening 22 there is an agitator shaft 23 which has two agitator arms 24. Bolts 25 are disposed on said agitator shaft 23 at a uniform distance from the filter plate 21, said bolts 25 holding agitator blades 26. These agitator blades 26 are made of spring steel or, e.g. a polyurethane elastomer characterized by high resistance to wear and corresponding elasticity. The deformability of the agitator blades 26 is measured so that it is greater than the force exerted on the agitator blades 26 by the solid filter cake, but less than the magnitude of resistance of the well disintegrated filter cake.

In the operation of the filtering device according to FIGS. 1 and 2, the agitator blades 6 assume the normal position illustrated in FIG. 1 in the solid filter cake, at an angled to the circular path. If the agitator then begins to operate, its direction of rotation being towards the left, the agitator blades 6 are pushed into the neutral position tangential to the circular path according to FIG. 2, as the force exerted by the solid filter cake is greater than the spring tension acting upon the agitator blades 6. As the filter cake increasingly disintegrates, this force decreases, so that eventually the spring tension prevails and the agitator blades 6 become active as conveying elements, once again assuming the position shown in FIG. 1. The filter cake is thus advanced outwards. In order to remove the filter cake mass, the direction of rotation is reversed, the agitator blades 6 maintaining the position according to FIG. 1, although they advance inwards towards the discharge opening 2.

In the operation of the filtering device according to FIGS. 3 and 4, the agitator blades 26 assume the normal position illustrated in FIG. 3 in the solid filter cake, at an angle to the circular path. If the agitator then begins to operate, its direction of rotation being towards the left, the agitator blades 26 are moved into the neutral position tangential to the circular path according to FIG. 4, as the force exerted by the solid filter cake is greater than the deformation resistance of the agitator blades 26. As the filter cake increasingly disintegrates, this force decreases, until finally the deformation resistance of the agitator blades 26 prevails and the agitator blades 26 become active as conveying elements, once again assuming the position according to FIG. 3. The filter cake is thus advanced outwards. In order to remove the filter cake mass, the direction of rotation is reversed, the agitator blades 26 maintaining the position according to FIG. 3, although they advance inwards towards the discharge opening 22, a stop at the rear blade end preventing any variation of the setting angled.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A filtering device with an agitator, comprising a horizontal filter plate having a central discharge opening, an agitator shaft disposed vertically and centrally to the filter plate, said agitator shaft having two agitator arms with agitator blades being disposed on said agitator arms and set at a normal nontangential angle to a circular path of rotation of said blades by tensioning means which allow for movement of said blades from said normal nontangential angle to a second position angle tangential to said circular path in response to the resistance of filter cake disposed on the filter plate, and for movement back to said normal angle in response to increasing disintegration of said filter cake.

2. The filtering device of claim 1, comprising bolt means for pivoting the agitator blades on to the agitator arm and wherein the tensioning means comprises a spring and connecting rod connected to said blades.

3. The filtering device of claim 1, wherein the tensioning mean comprises agitator blades made of wear-resistant elastic material and fixed securely in their normal position at an angle to their circular path by means of bolts.

* * * * *